United States Patent

Sheu

(10) Patent No.: US 6,654,243 B2
(45) Date of Patent: Nov. 25, 2003

(54) HEAT DISSIPATION OF LOW FLOW RESISTANCE IN A NOTEBOOK COMPUTER

(75) Inventor: Young-Kwang Sheu, Chung Li (TW)

(73) Assignee: Uniwill Computer Corporation, Tao Yuan Hsien (TW)

( * ) Notice: Subject to any disclaimer, the term of this patent is extended or adjusted under 35 U.S.C. 154(b) by 0 days.

(21) Appl. No.: 10/013,461

(22) Filed: Dec. 13, 2001

(65) Prior Publication Data
US 2003/0039096 A1 Feb. 27, 2003

(30) Foreign Application Priority Data
Aug. 24, 2001 (CN) ........................ 90214579 U

(51) Int. Cl.[7] ............................................. H05K 7/20
(52) U.S. Cl. ................ 361/687; 361/700; 454/184; 165/121
(58) Field of Search .................. 361/687, 685, 361/726, 700; 454/184; 62/259.2; 165/80.3, 121–122, 104.33; 415/176–178; 417/423.2; 174/15.2

(56) References Cited

U.S. PATENT DOCUMENTS

| | | | | |
|---|---|---|---|---|
| 6,115,252 A | * | 9/2000 | Ohta et al. | 361/700 |
| 6,352,103 B1 | * | 3/2002 | Chu et al. | 165/80.3 |
| 6,359,780 B1 | * | 3/2002 | McMahan et al. | 361/687 |

* cited by examiner

Primary Examiner—Darren Schuberg
Assistant Examiner—Hung Van Duong
(74) Attorney, Agent, or Firm—Nixon Peabody LLP; Donald P. Studebaker

(57) ABSTRACT

The present invention provides a heat dissipation apparatus for a notebook computer with a low flow resistance design. The notebook computer has a CPU, a heat dissipation apparatus, an air inlet, and an air outlet. The heat dissipation apparatus includes a heat sink, at least a fan, a conduction block, and a heat pipe. The heat sink is used to transmit heat. The conduction block is closely contacted to an upper surface of the CPU in the notebook computer for absorbing the heat from CPU. The heat pipe is connected to the conduction block and the heat sink. The heat pipe is configured for transmitting heat in the conduction block to the heat sink. Then, the heat transferred to the heat sink is carried away by air flow generated by the fan. In the invention, the air flow directions passing through the air inlet and the air outlet are parallel to each other. The air flow resistance is substantially reduced to accelerate the heat dissipation.

3 Claims, 6 Drawing Sheets

HEAT DISSIPATION OF LOW FLOW RESISTANCE IN A NOTEBOOK COMPUTER

BACKGROUND OF THE INVENTION

1. Field of the Invention

The present invention relates to a heat dissipation apparatus for a notebook computer and, more particularly, to a heat dissipation apparatus for a notebook computer with a low flow resistance design.

2. Description of the Related Arts

It is well known that computers and other electronic devices commonly include components that produce heat while operating. There is no doubt that heat dissipation has been one of the biggest problems in computer design. To maintain computers or electronic devices within operating temperature limits, various types of heat dissipation system have been proposed for removing heat from the heat-producing components. In earlier years, the passive cooling method is proposed to solve the heat dissipation issue. However, during the past few years, the heat generated by the CPU of computer has substantially increased from 7W, 8W, 12W, 17W, . . . , up to 60W. It is almost ten times more than the heat generated by CPU before. Not comparably, materials of good heat dissipation property are developed slowly. For example, the thermal conductivity coefficient of aluminum used in early days was about 200 w/m ° C., and the thermal conductivity coefficient of copper used nowadays is about 400 w/m° C. Therefore, the heat dissipation problems of computer become much more difficult than ever.

Fortunately, the introduction of heat pipe solves the heat dissipation problem. Material of the heat pipe is just a combination of copper and fluid. But, the thermal conductivity coefficient of the heat pipe is increased to about 10000 w/m° C. which is fifty times more than that of aluminum. That is, the heat pipe has the potential of rapidly transferring heat away from a microprocessor chip or other heat-generating components. The application of heat pipe to the notebook computer not only solves the heat dissipation problem, but also has the benefit of being easily manufactured. Gradually, the heat pipe is normally implemented in notebook computers to take heat away.

However, heat dissipation simply based on conduction mechanism does not satisfy today's need. How to incorporate heat-exchange behavior transferring heat to the atmosphere is another key aspect for heat dissipation of notebook computers. The heat-exchange occurs between cool air and the heat dissipation apparatus. Forcing the heat-exchange to be accomplished by fan is one of most effective ways to transfer heat to the atmosphere.

FIG. 1 shows a notebook computer of a conventional heat dissipation apparatus. The notebook computer includes a CPU, an air inlet, and an air outlet. The conventional heat dissipation apparatus includes a fan, a heat sink, a conduction block, and a heat pipe. The heat generated by the CPU is absorbed in the conduction block. The heat pipe is connected to the conduction block and the heat sink. The heat pipe is configured for transmitting heat in the conduction block to the heat sink. Then, the heat transferred to the heat sink is carried away by air flow generated by the fan. However, the fan mentioned above is often vertically set up in a notebook computer casing. When the notebook computer size is destined to shrink, the heat dissipation apparatus is restricted to a limited space. Due to the thickness of the limited space of the notebook computer, it is not feasible to increase the fan in number and size. Moreover, the air flow direction passing through the air inlet and the air outlet are nonparallel to each other. Consequently, the heat dissipation apparatus results in large air flow resistance and inefficient heat dissipation.

FIG. 2 shows another notebook computer of a conventional heat dissipation apparatus. The notebook computer includes a CPU, an air inlet, and an air outlet. The conventional heat dissipation apparatus includes a flat cartridge with a fan positioned thereon, an air passage, a heat sink adjacent to a sidewall of the flat cartridge, a conduction block, and a heat pipe. The heat generated by the CPU is absorbed in the conduction block. The heat pipe is connected to the conduction block and the heat sink. The heat pipe is configured for transmitting heat in the conduction block to the heat sink. Then, the heat transferred to the heat sink is carried away by air flow generated by the fan. The fan mentioned above is horizontally positioned on the flat cartridge in a notebook computer casing. Due to the fan is horizontally positioned, it is possible to improve the capability of heat dissipation by using a larger fan. However, the air directions passing through the air inlet and the air outlet are still nonparallel to each other. Accordingly, the heat dissipation apparatus mentioned above also results in large air flow resistance and disappointing heat dissipation efficiency.

SUMMARY OF THE INVENTION

The present invention provides a heat dissipation apparatus to promote the heat dissipation efficiency for a notebook computer and, more particularly, for a notebook computer with high flow rate and high input power.

The present invention adopts heat pipe to carry heat aside from the CPU. Afterwards, the heat is carried away by fans. Furthermore, the present invention places emphasis on air flow direction. The air flow directions passing through the air inlet and the air outlet are parallel to each other. Drawbacks in prior arts are eliminated to improve heat dissipation more effectively under the limitation of restricted space.

The present invention provides a heat dissipation apparatus including a heat sink, at least one fan, a conduction block, and a heat pipe. The heat sink is used for transmitting heat. The conduction block is closely contacted to an upper surface of a CPU in a notebook computer for absorbing heat from the CPU. The heat pipe is connected to the conduction block and the heat sink. The heat pipe is configured for transmitting heat in the conduction block to the heat sink. Then, the heat transferred to the heat sink is carried away by air flow generated by the fan. In the present invention, the air flow directions passing through an air inlet and an air outlet are parallel to each other. Therefore, the air flow resistance is reduced to accelerate the heat dissipation.

Notebook computer, in accordance with the present invention, in one embodiment, includes a CPU, an air inlet, an air outlet, and a heat dissipation apparatus. The heat dissipation apparatus includes a heat sink, at least one fan, a conduction block, and a heat pipe. The air inlet is used to inhale air, and the air outlet is used to exhaust air. The heat sink is used to transmit heat. The conduction block is closely contacted to an upper surface of the CPU in the notebook computer for absorbing the heat from CPU. The heat pipe is connected to the conduction block and the heat sink. The heat pipe is configured for transmitting heat in the conduction block to the heat sink. Then, the heat transferred to the heat sink is carried away by air flow generated by the fan. In the present invention, the air flow directions passing through the air inlet and the air outlet are parallel to each other. Therefore, the air flow resistance is reduced to accelerate the heat dissipation.

DETAILED DESCRIPTION OF THE INVENTION

Figure 3:
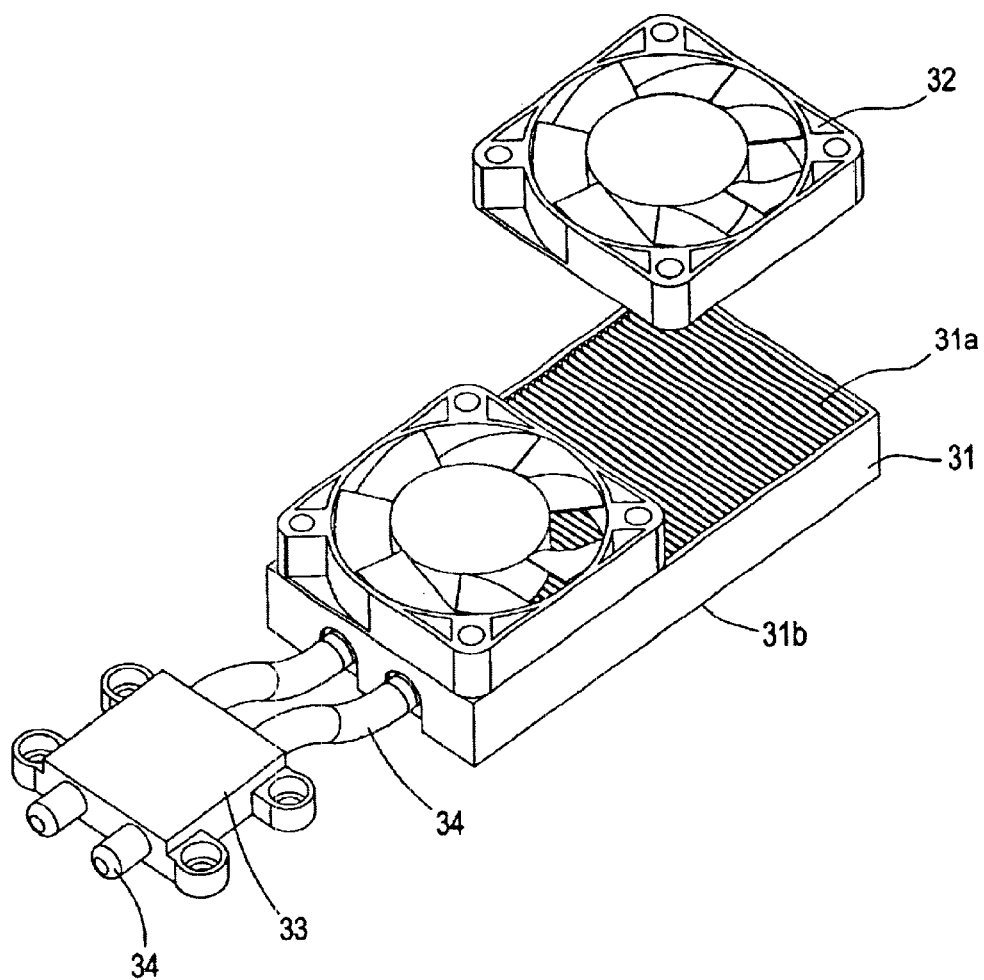
FIG. 3 shows a heat dissipation apparatus of the present invention for a notebook computer.

Please refer to FIG. 3. FIG. 3 shows a heat dissipation apparatus of the present invention for a notebook computer. The notebook computer has a CPU, an air inlet, and an air outlet.

The heat dissipation apparatus includes a heat sink 31, at least a fan 32, a conduction block 33, and a heat pipe 34. The heat sink 31 is used for transmitting heat. The conduction block 33 is closely contacted to an upper surface of the CPU (not shown) in the notebook computer.

The heat pipe 34 is connected to the conduction block 33 and the heat sink 31. The heat pipe 34 is configured for transmitting heat in the conduction block 33 to the heat sink 31. Then, the heat transferred to the heat sink 31 is carried away by air flow generated by the fan 32. In the present invention, the air flow directions passing through the air inlet and the air outlet are parallel to each other. Therefore, the air flow resistance is substantially reduced to accelerate the heat dissipation.

Figure 4A:
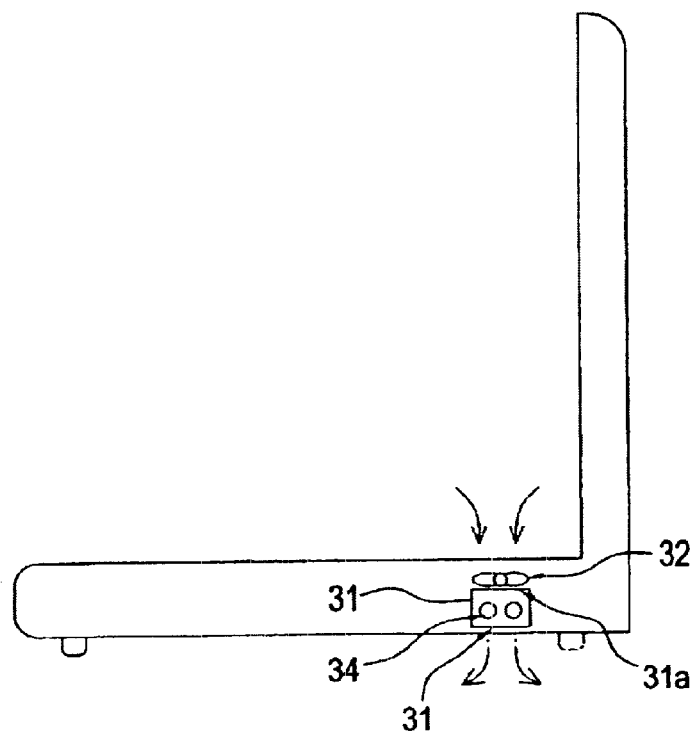
FIG. 4(a) and FIG. 4(b) together show a first embodiment of a notebook computer with the heat dissipation apparatus of the present invention.
Figure 4B:
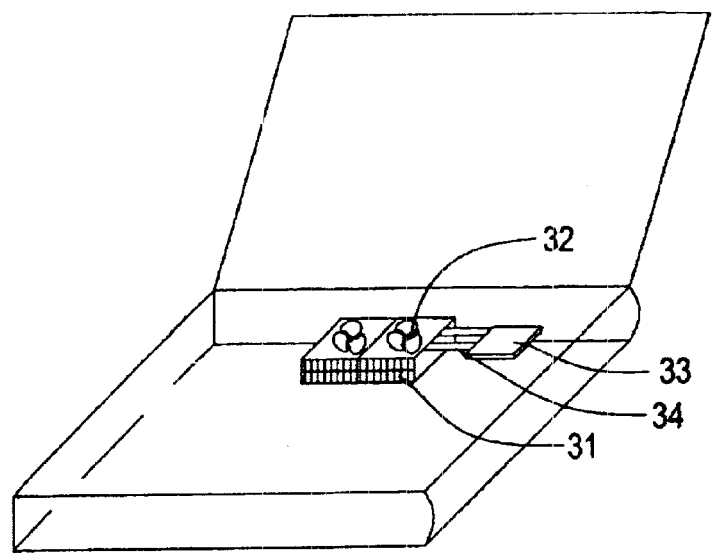

Please refer to FIG. 4(a) and FIG. 4(b). FIG. 4(a) and FIG. 4(b) together show a first embodiment of the present invention for a notebook computer. In the present invention, the heat sink 31 has a top surface 31a and a bottom surface 31b. The top surface 31a of the heat sink 31 is disposed underneath the fan 32, the fan 32 corresponds to the air inlet, and the bottom surface 31b of the heat sink 31 corresponds to the air outlet.

Figure 5A:
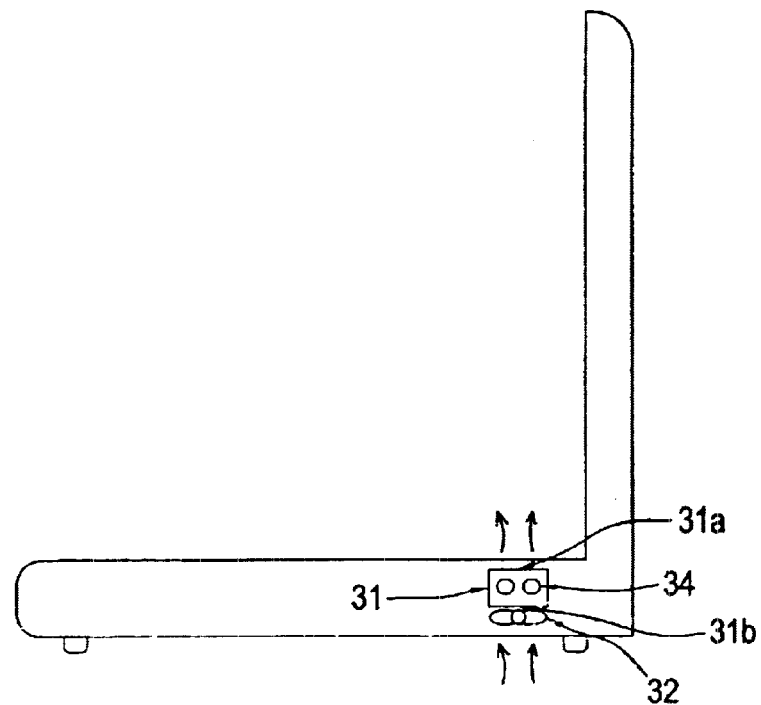
FIG. 5(a) and FIG. 5(b) together show a second embodiment of a notebook computer with the heat dissipation apparatus of the present invention.
Figure 5B:
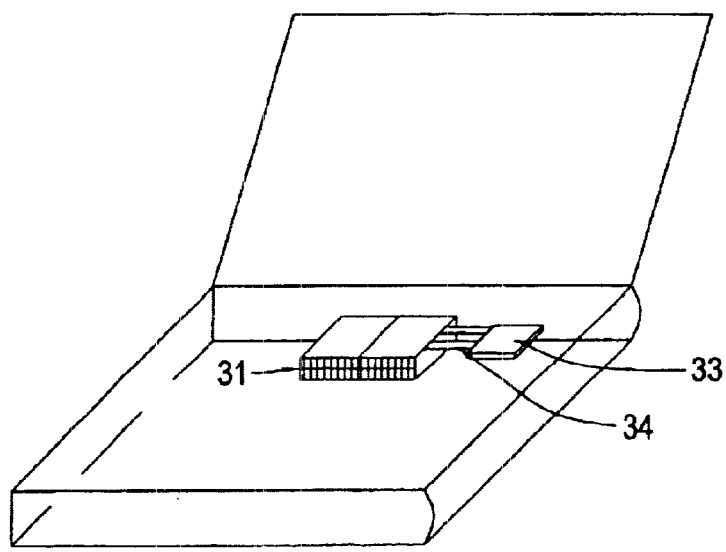

Please refer to FIG. 5(a) and FIG. 5(b). FIG. 5(a) and FIG. 5(b) together show a second embodiment of the present invention. In the present invention, the heat sink 31 has a top surface 31a and a bottom surface 31b. The bottom surface 31b of the heat sink 31 is disposed above the fan 32, the top surface 31a of the heat sink 31 corresponds to the air inlet, and the fan 32 corresponds to the air outlet.

Figure 1:
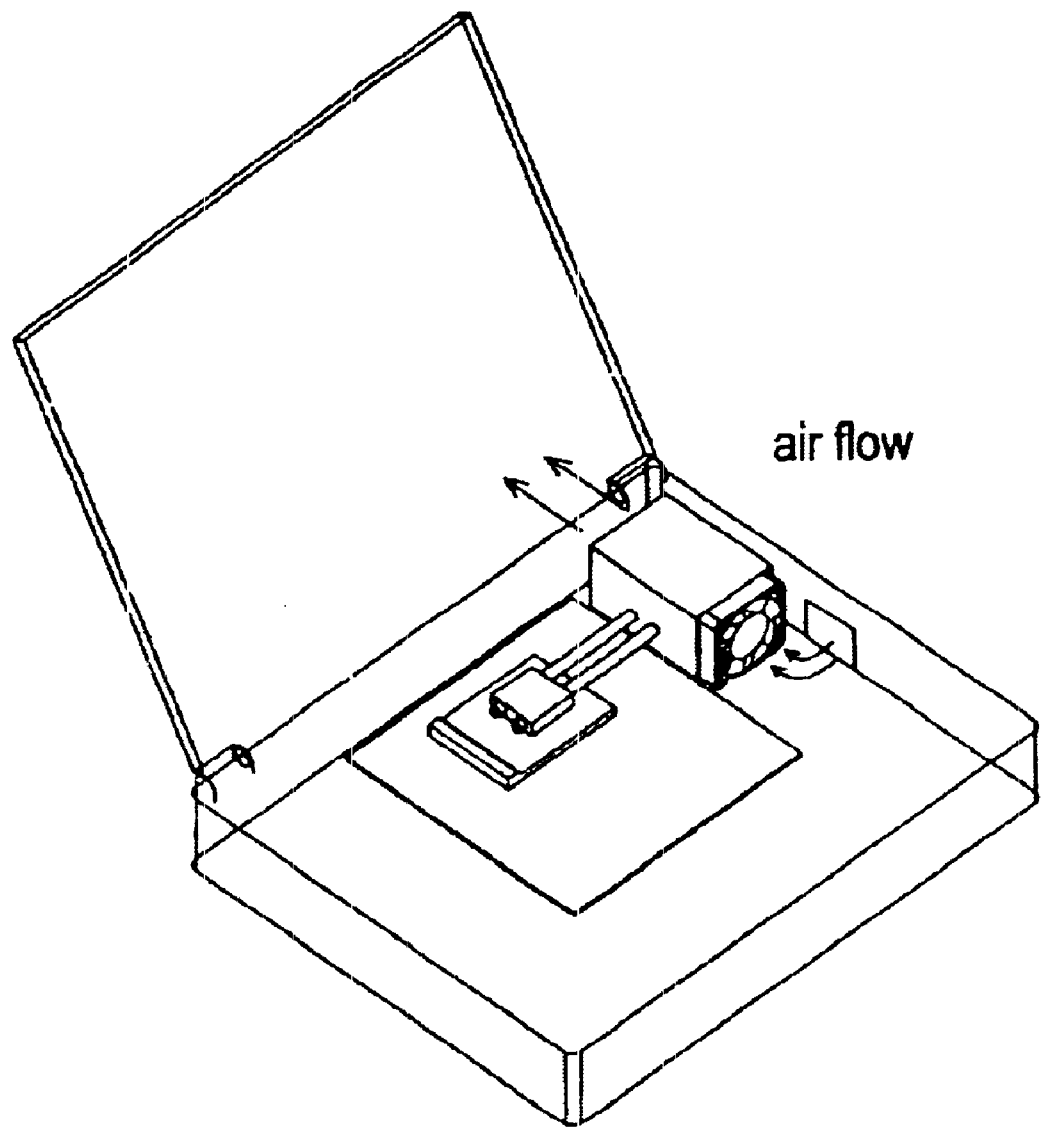
FIG. 1 shows a notebook computer of a conventional heat dissipation apparatus.
Figure 2:
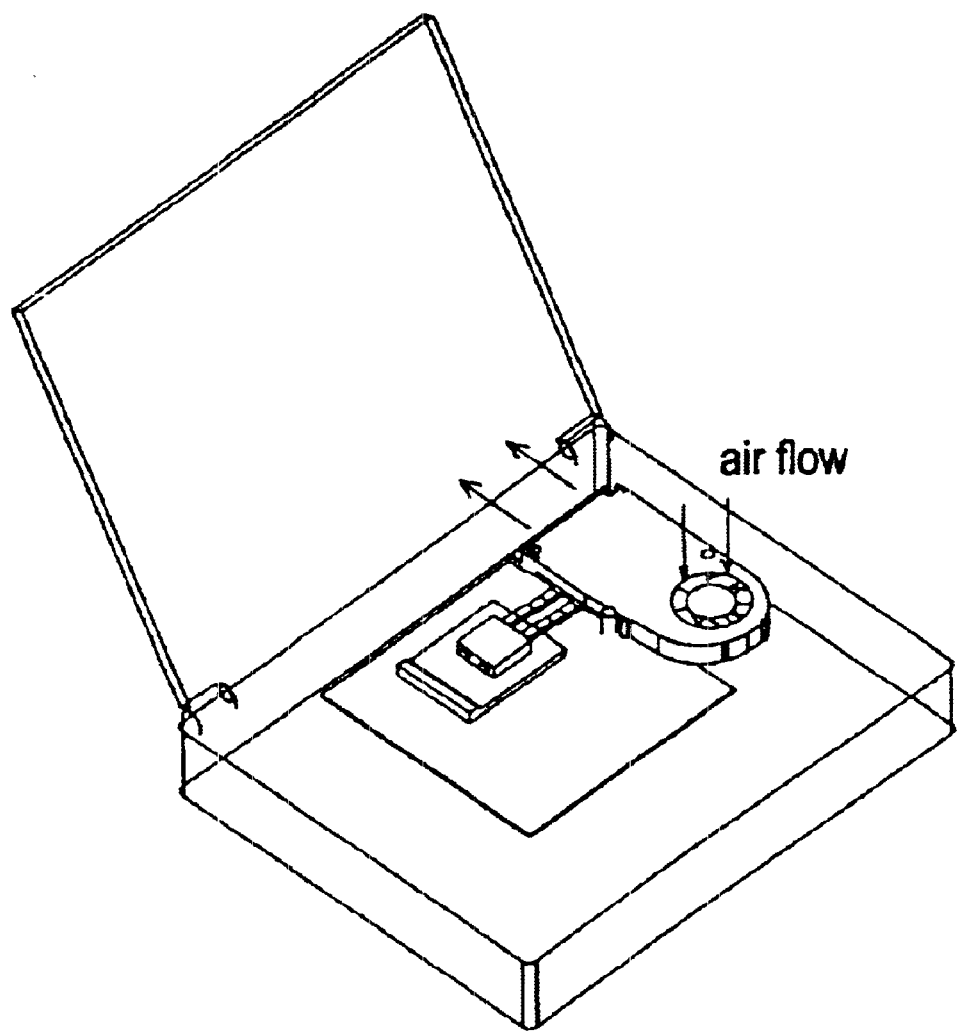
FIG. 2 shows another notebook computer of a conventional heat dissipation apparatus.
Figure 6:
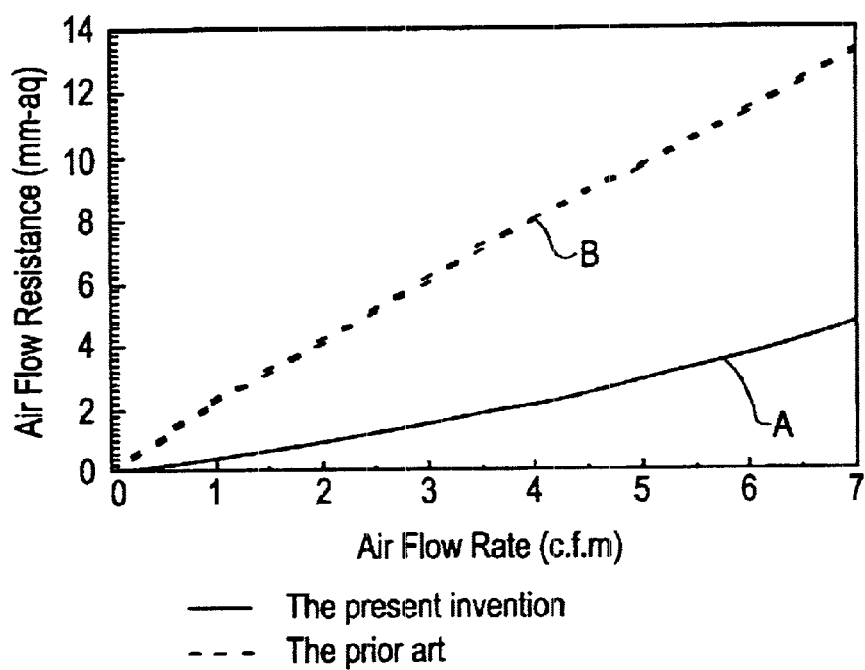
FIG. 6 shows a comparison diagram of the air flow resistance between the conventional heat dissipation apparatus in FIG. 2 and the heat dissipation apparatus of the present invention in FIG. 3.

FIG. 6 shows a comparison diagram of the air flow resistance between the conventional heat dissipation apparatus in FIG. 2 and the present invention in FIG. 3. The X-axis represents the air flow rate, and the Y-axis represents the air flow resistance. In FIG. 6, the air flow resistance curve A corresponding to the present invention and the air flow resistance curve B corresponding to the conventional heat dissipation apparatus are shown. As shown in FIG. 6, the air flow resistance of the present invention is less than that of the conventional heat dissipation apparatus. It is observed that in the conventional heat dissipation apparatus of FIG. 2, the air flow directions passing through the air inlet and the air outlet are nonparallel to each other. Different from the prior art, the air flow directions passing through the air inlet and the air outlet in the present invention are parallel to each other. Therefore, the air flow resistance of the present invention is reduced and the heat dissipation efficiency is much better promoted.

Figure 7:
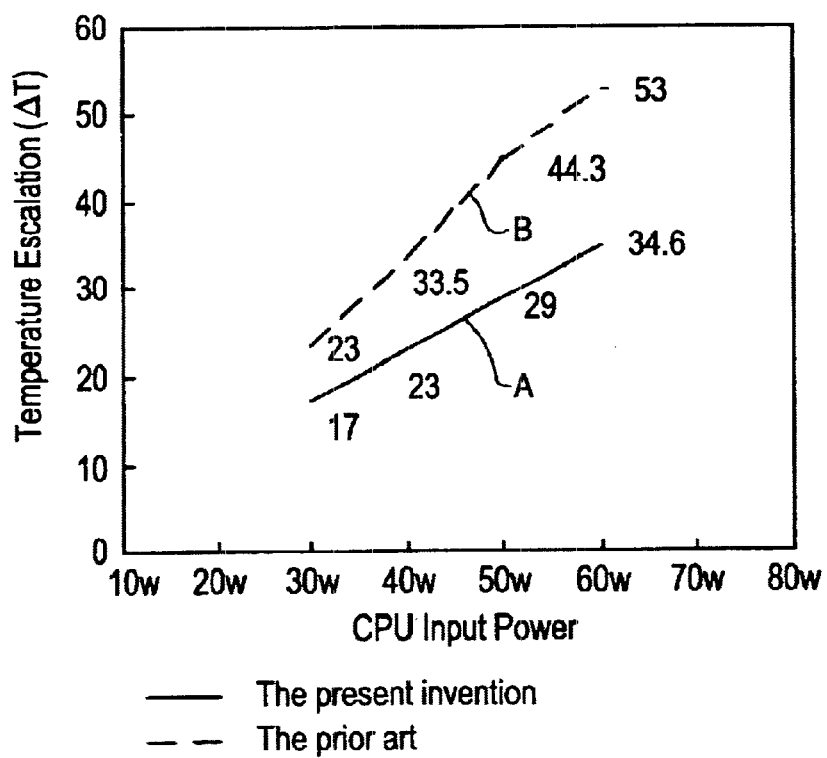
FIG. 7 shows a comparison diagram of the temperature escalation between the conventional heat dissipation apparatus in FIG. 2 and the heat dissipation apparatus of the present invention in FIG. 3.

FIG. 7 shows a comparison diagram of the temperature escalation between the conventional heat dissipation apparatus in FIG. 2 and the present invention in FIG. 3. The X-axis represents the CPU input power, and the Y-axis represents the escalation temperature. As shown in FIG. 7, the temperature escalation of the heat dissipation apparatus of the present invention is much less than that of the conventional heat dissipation apparatus. From FIG. 7, it is noted that the heat dissipation efficiency of the present invention is better than the heat dissipation efficiency of the conventional heat dissipation apparatus in FIG. 2.

As shown in FIG. 6 and FIG. 7, the heat dissipation apparatus of the present invention substantially reduces the air flow resistance and the temperature escalation, especially at high air flow rate and high input power. Therefore, the present invention meets the needs for the heat dissipation apparatus of the notebook computer.

A notebook computer in accordance with the present invention includes a CPU, an air inlet, an air outlet, and a heat dissipation apparatus. The heat dissipation apparatus includes a heat sink 31, at least a fan 32, a conduction block 33, and a heat pipe 34. The air inlet is used to inhale the air, and the outlet is used to exhaust the air. The heat sink 31 is used to transmit heat. The conduction block 33 is closely contacted to an upper surface of the CPU (not shown) in the notebook computer.

The heat pipe 34 is connected to the conduction block 33 and the heat sink 31. The heat pipe 34 is configured for transmitting heat in the conduction block 33 to the heat sink 31. Then, the heat transferred to the heat sink 31 is carried away by air flow generated by the fan 32. In the invention, the air flow directions passing through the air inlet and the air outlet are parallel to each other. Therefore, the air flow resistance is substantially reduced to accelerate the heat dissipation.

Please refer to FIG. 4(a) and FIG. 4(b). FIG. 4(a) and FIG. 4(b) together show a first embodiment of a notebook computer with the present invention. In the present invention, the heat sink 31 has a top surface 31a and a bottom surface 31b. The top surface 31a of the heat sink 31 is disposed underneath the fan 32, the fan 32 corresponds to the air inlet, and the bottom surface 31b of the heat sink 31 corresponds to the air outlet.

Please refer to FIG. 5(a) and FIG. 5(b). FIG. 5(a) and FIG. 5(b) together show a second embodiment of a notebook computer with the present invention. In the present invention, the heat sink 31 has a top surface 31a and a bottom surface 31b. The bottom surface 31b of the heat sink 31 is disposed above the fan 32, a top surface 31a of the heat sink 31 corresponds to the air inlet, and the fan 32 corresponds to the air outlet.

FIG. 6 shows a comparison diagram of the air flow resistance between the notebook computer with the conventional heat dissipation apparatus in FIG. 2 and the notebook computer with the present invention in FIG. 3. The X-axis represents the air flow rate, and the Y-axis represents the air flow resistance. In FIG. 6, the air flow resistance curve A of a notebook computer corresponding to the present invention and the air flow resistance curve B of a notebook computer corresponding to the conventional heat dissipation apparatus are shown. As shown in FIG. 6, the air flow resistance of the notebook computer with the present invention is less than that with the conventional heat dissipation apparatus. It is observed that in the conventional heat dissipation apparatus of FIG. 2, the air flow directions passing through the air inlet and the air outlet still are nonparallel to each other. Different from the prior art, the air flow directions of the notebook computer at the air inlet and the air outlet in the present invention are parallel to each other. Therefore, the air flow resistance of the notebook computer with the present invention is less, and the heat dissipation efficiency is much upgraded.

FIG. 7 shows a comparison diagram of the temperature escalation between the notebook computer with the conventional heat dissipation apparatus in FIG. 2 and the notebook computer with the present invention in FIG. 3. The X-axis represents the CPU input power, and the Y-axis represents the temperature escalation. As shown in FIG. 7, the temperature escalation of the notebook computer with the present invention is much less than that with the conventional heat dissipation apparatus. From FIG. 7, we note the notebook computer with the present invention is better than that with the conventional heat dissipation apparatus in FIG. 2.

As shown in FIG. 6 and FIG. 7, the notebook computer with the present invention substantially reduces the flow resistance and the temperature escalation, especially when this notebook computer is used at high air flow rate and high input power. Therefore, the present invention meets needs for the heat dissipation apparatus of the notebook computer.

In the foregoing specification the invention has been described with reference to specific embodiments. It will, however, be evident that various modification and changes may be made to thereto without departing from the broader spirit and scope of the invention. The specification and drawings are, accordingly, to be regarded in an illustrative rather than restrictive sense. Thus, it is intended that the present invention covers the modification and variations of this invention provided they come within the scope of the appended claims and their equivalents.

What is claimed is:

1. A heat dissipation apparatus for a notebook computer having a CPU, an air inlet, and an air outlet, comprising:
   at least a fan;
   a heat sink having a top surface and a bottom surface, said top surface of said heat sink is disposed underneath said fan, said fan corresponds to said air inlet, and said bottom surface of said heat sink corresponds to said air outlet;
   a conduction block closely contacted to an upper surface of said CPU; and
   a heat pipe connected to said conduction block and said heat sink respectively for transmitting heat absorbed in said conduction block to said heat sink;
   wherein, air flow directions passing through said air inlet and said air outlet are parallel to each other.

2. A heat dissipation apparatus for a notebook computer having a CPU, an air inlet, and an air outlet, comprising:
   at least a fan;
   a heat sink having a top surface and a bottom surface, said bottom surface of said heat sink is disposed above said fan, said top surface of said heat sink corresponds to said air inlet, and said fan corresponds to said air outlet;
   a conduction block closely contacted to an upper surface of said CPU; and
   a heat pipe connected to said conduction block and said heat sink respectively for transmitting heat absorbed in said conduction block to said heat sink;
   wherein, air flow directions passing through said air inlet and said air outlet are parallel to each other.

3. A notebook computer comprising:
   a CPU;
   an air inlet;
   an air outlet;
   a heat sink having a top surface and a bottom surface;
   at least a fan;
   a conduction block closely contacted to an upper surface of said CPU; and
   a heat pipe connected to said conduction block and said heat sink respectively for transmitting heat absorbed in said conduction block to said heat sink;
   wherein, said top surface of said heat sink is disposed underneath said fan, said fan corresponds to said air inlet, and said bottom surface of said heat sink corresponds to said air outlet; or
   wherein said bottom surface of said heat sink is disposed above said fan, said top surface of said heat sink corresponds to said air inlet, and said fan corresponds to said air outlet;
   wherein, air flow directions passing through said air inlet and said air outlet are parallel to each other.

* * * * *